Patented Aug. 14, 1945

2,382,241

UNITED STATES PATENT OFFICE 2,382,241

PRODUCTION OF NITROPARAFFINS

Norman Levy, Norton Hall, Norton-on-Tees, England, assignor to Imperial Chemical Industries Limited, a corporation of Great Britain No Drawing. Application February 2, 1940, Serial No. 316,980. In Great Britain March 28, 1939

2 Claims. (Cl. 260—644)

This invention relates to the production of nitroparaffins from nitrogen peroxide and paraffins.

Due to the unusual reactively of nitroparaffins, many compounds may be obtained readily from this class of materials. Consequently, those engaged in the chemical industry have recently sought to perfect processes for the production of said nitroparaffins, particularly those methods which involve the direct nitration of the paraffin or hydrocarbon. In general, the processes known to the art are characterized by low yields and impure product, so that they are of doubtful utility.

An object of the present invention is a method for producing nitroparaffins by the direct nitration of paraffins. Another object is a method which is feasible because of simplicity and economy. A further object is a method for nitrating paraffins to produce the corresponding nitroparaffins, wherein the nitrating agent is nitrogen peroxide. A still further object is the direct nitration of hydrocarbons by means of substantially pure nitrogen peroxide, said nitration being effected in the presence of a catalyst comprising compounds of arsenic and antimony. Other objects will become apparent as the invention is described more fully hereinafter.

I have found that nitroparaffins can be produced by the interaction in the gaseous phase, at temperatures of 100° C. or over, of nitrogen peroxide and a paraffin or paraffins in the presence of compounds of arsenic and/or antimony, e. g., the oxides of arsenic and/or antimony or the alkali salts of their oxyacids, such as the arsenate or arsenite of sodium, and/or potassium antimonate, or materials containing the same. Silicate glasses containing compounds of arsenic and/or antimony may also be used as catalysts.

It is preferable to use nitrogen peroxide free from other oxides of nitrogen, e. g., nitric oxide and nitrogen trioxide, and also to dry the gaseous mixture of nitrogen peroxide and the paraffin or paraffins before it reaches the catalyst, for example by passage over phosphorus pentoxide, as I have found that the presence of water and oxides of nitrogen other than the peroxide decreases the yield of nitroparaffin or nitroparaffins. In general, it is also desirable to avoid the presence of other gases, for example, nitrogen and oxygen, in the reactant mixture, as they tend to decrease the yield of nitroparaffin or nitroparaffins. The presence of free oxygen, for example, leads to the production of oxidation products of the paraffin or paraffins. In particular circumstances, however, for example, as indicated below, the presence of a diluent gas may be desirable. The reaction may be effected at atmospheric pressure, but higher or lower pressures may be used, if desired.

The reaction temperature may range from 100° C. upwards, the upper temperature limit depending on the paraffin or paraffins used, and on the free space in the catalyst mass. I prefer to operate below the temperature at which the mixture of the paraffin or paraffin with nitrogen peroxide ignites, so that in general the upper temperature limit is fixed by the ignition temperature of such a mixture under the conditions of operation. Thus, with n-butane and a 50% free space in the catalyst mass consisting of an arsenic-containing silicate glass, the temperature should not exceed 310° C.

At the higher temperatures it is preferable to decrease both the time of contact of the initial substances with the catalyst and the ratio of nitrogen peroxide to paraffins. At 200° C. and at atmospheric pressure, I prefer to operate with a nitrogen peroxide-paraffin ratio (by volume) of 2:1 and a time of contact of 120 seconds, while at 280° C. and at atmospheric pressure, I prefer to operate with a nitrogen peroxide/paraffin ratio of 1.5:1 and a time of contact of 45 seconds. At temperatures higher than 280° C. it is desirable to avoid the use of nitrogen peroxide-paraffin ratios higher than 1.5:1, as not only is the yield of nitroparaffin decreased, but explosion may occur. If such temperatures and ratios are used, a diluent gas such as nitrogen may be added to the initial substances in order to avoid such decreased yields and explosions.

At the lower temperatures, the product is a single liquid phase and contains, in addition to nitroparaffins, dissolved nitrogen peroxide, small amounts of nitric acid and oxidation products of the paraffins such as fatty acids. The nitrogen peroxide may be removed by decreasing the pressure over the product (degassing), and the remaining impurities may be washed out with water. At higher temperatures the product consists of two liquid phases, namely an upper layer of nitroparaffin and a lower layer of dilute nitric acid. The latter may be removed by a separating operation and the upper layer may be washed with a little water.

*Example 1*

A gas mixture containing 30% isobutane and 70% normal butane was led into a series of mixing vessels at the rate of 5 liters per hour, together with 10 liters per hour of pure nitrogen peroxide, after which the mixed gases passed through a phosphorus pentoxide drier to a converter packed with catalyst consisting of fragments of a glass containing sodium arsenite. The catalyst was maintained at a temperature of 200° C. and the gases were passed through it at such a rate as to give a contact time of 120 seconds, (corrected to 20° C. at atmospheric pressure). The issuing gases were cooled to condense the nitroparaffins.

The liquid product, after nitrogen peroxide removal, washing and drying, consisted of:

| | Per cent by weight |
|---|---|
| Tertiary mononitroisobutane | 60 |
| 2-nitro-n-butane | 20 |
| 2:3 dinitro-n-butane | 20 |

The yield of tertiary nitroparaffin obtained from the isobutane was 90% per passage, or 95% of isobutane consumed. The yield of the secondary nitroparaffins derived from normal butane was 25% per passage, or 90% of the butane consumed. The overall yield of nitroparaffin was 45% per passage, or 90% of the butane mixture consumed.

Example 2

Using the same conditions as in Example 1, but substituting propane for the mixture of butanes, the product obtained after degassing, washing and drying was 2-nitropropane.

Example 3

A gas mixture produced from n-butane supplied at the rate of 6 liters per hour, and nitrogen peroxide supplied at the rate of 9 liters per hour was passed through the same catalyst as in Example 1 but at a temperature of 280° C., and with a time of contact 45 seconds. The product contained 2-nitro-n-butane and 2:3-dinitro-n-butane, the overall yield being 90% of the butane consumed.

It will be evident from the foregoing description that my invention offers a facile method for producing nitroparaffins. Furthermore, this method has the advantage of offering starting materials which are low priced and which are readily available, in view of the fact that nitrogen peroxide may be obtained as a product of plants wherein ammonia is oxidized to form nitric acid. Since the yield of nitroparaffin when produced according to this process is high, and the nitration is effected in a single step, the desired nitroparaffins can be obtained economically.

Certain variations from the description set forth in the foregoing will be evident to those skilled in the nitration art. I intend therefore to be bound only in accordance with the following claims.

I claim:

1. A method of producing nitroparaffins which comprises reacting in vapor phase dry nitrogen peroxide and at least one paraffin by passing the mixed gases thru a drier to a converter packed with fragments of a catalyst selected from the group consisting of the compounds of arsenic and antimony, said catalyst being maintained at a temperature of at least 100° C. and cooling the issuing gases to condense the nitroparaffins therefrom.

2. The method of claim 1 wherein the catalyst comprises fragments of a glass containing a compound selected from the group consisting of the compounds of arsenic and antimony.

NORMAN LEVY.

---

CERTIFICATE OF CORRECTION.

Patent No. 2,382,241.   August 14, 1945.

NORMAN LEVY.

It is hereby certified that error appears in the printed specification of the above numbered patent requiring correction as follows: Page 1, first column, line 4, for "reactively" read --reactivity--; and second column, line 9, for "paraffin" second occurrence, read --paraffins--; and that the said Letters Patent should be read with this correction therein that the same may conform to the record of the case in the Patent Office.

Signed and sealed this 13th day of November, A. D. 1945.

Leslie Frazer (Seal)   First Assistant Commissioner of Patents.